(12) United States Patent
Bhardwaj (10) Patent No.: US 9,578,592 B2
(45) Date of Patent: Feb. 21, 2017

(54) METHOD AND ARRANGEMENT FOR PCI ASSIGNMENT

(71) Applicant: Telefonaktiebolaget L M Ericsson (publ), Stockholm (SE)

(72) Inventor: Ashish Bhardwaj, Guna (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/764,737

(22) PCT Filed: Feb. 1, 2013

(86) PCT No.: PCT/SE2013/050086
§ 371 (c)(1),
(2) Date: Jul. 30, 2015

(87) PCT Pub. No.: WO2014/120056
PCT Pub. Date: Aug. 7, 2014

(65) Prior Publication Data
US 2015/0373619 A1 Dec. 24, 2015

(51) Int. Cl.
*H04W 4/00* (2009.01)
*H04W 40/24* (2009.01)
(Continued)

(52) U.S. Cl.
CPC ........ *H04W 40/246* (2013.01); *H04J 11/0069* (2013.01); *H04J 13/0003* (2013.01);
(Continued)

(58) Field of Classification Search
CPC .... H04W 24/02; H04W 72/042; H04W 28/06; H04W 4/08; H04W 72/0406; H04W 72/082; H04W 8/26; H04W 72/04; H04W 16/10; H04W 16/18; H04W 48/12; H04W 48/20; H04W 72/005; H04W 72/02; H04W 72/0446; H04L 5/005; H04L 5/0048; H04L 5/0073; H04L 5/0035; H04B 7/2606; H04J 11/0073; H04J 11/0076; H04J 11/0086
(Continued)

(56) References Cited

U.S. PATENT DOCUMENTS 8,050,225 B2 11/2011 Luo
2011/0261777 A1* 10/2011 Maeda ............... H04W 48/20
370/329
(Continued)

FOREIGN PATENT DOCUMENTS

CN 102595416 A 7/2012
EP 2 369 875 A1 9/2011
(Continued)

OTHER PUBLICATIONS

International Search Report and Written Opinion of the International Searching Authority, Application No. PCT/SE2013/050086, Jan. 2, 2014.
(Continued)

*Primary Examiner* — Allahyar Kasraian
(74) *Attorney, Agent, or Firm* — Myers Bigel, P.A.

(57) ABSTRACT

Network node and method therein for assignment of Physical Cell Identities (PCIs) to Radio Base Stations (RBSs) in a wireless communication network. The method includes determining a most densely located RBS, based on the distances from each RBS to a certain number of other RBSs of the plurality of RBSs. The method further includes, for each RBS, i, for which a PCI is to be assigned: assigning a Secondary Synchronization Signal (SSS) to the RBSi from a set of SSSs, based on a distance from the RBSi to another RBS in the communication network associated with the same SSS, and a number of tiers between the RBSi and, at least, the other RBS. Further, a Primary Synchronization
(Continued)

Signal (PSS) is assigned to the RBSi, based on the number of cells associated with the RBSi; and a PCI is assigned to the RBSi, based on the SSS and the PSS.

17 Claims, 10 Drawing Sheets

(51) Int. Cl.
    *H04W 24/02*     (2009.01)
    *H04J 11/00*     (2006.01)
    *H04L 5/00*     (2006.01)
    *H04J 13/00*     (2011.01)

(52) U.S. Cl.
    CPC ............. *H04L 5/005* (2013.01); *H04W 24/02* (2013.01); *H04J 2013/0096* (2013.01)

(58) Field of Classification Search
    USPC ..... 455/422.1, 423, 424, 434, 446; 370/312, 370/328
    See application file for complete search history.

(56) References Cited

U.S. PATENT DOCUMENTS

| | | | | |
|---|---|---|---|---|
| 2011/0280223 | A1* | 11/2011 | Maeda | H04W 72/082 370/335 |
| 2012/0021725 | A1* | 1/2012 | Rune | H04W 48/16 455/411 |
| 2012/0052869 | A1* | 3/2012 | Lindoff | H04J 11/0069 455/452.1 |
| 2012/0093059 | A1* | 4/2012 | Bai | H04L 5/0007 370/312 |
| 2012/0099565 | A1 | 4/2012 | Kim et al. | |
| 2012/0300686 | A1* | 11/2012 | Maeda | H04W 52/0206 370/311 |
| 2014/0036822 | A1* | 2/2014 | Maeda | H04W 72/04 370/329 |
| 2014/0050183 | A1* | 2/2014 | Mochizuki | H04W 72/1278 370/329 |
| 2014/0204809 | A1* | 7/2014 | Kim | H04J 13/0062 370/280 |
| 2014/0204853 | A1* | 7/2014 | Ko | H04L 5/0073 370/329 |
| 2015/0319611 | A1* | 11/2015 | Garcia | H04W 16/18 370/329 |

FOREIGN PATENT DOCUMENTS

| | | | | |
|---|---|---|---|---|
| WO | WO 2011/038272 | A1 | 3/2011 | |
| WO | WO 2013063896 | A1 * | 5/2013 | .......... H04J 11/0069 |

OTHER PUBLICATIONS

Lim et al., "Management of Neighbor Cell Lists and Physical Cell Identifiers in Self-Organizing Heterogeneous Networks", *Journal of Communications and Networks*, vol. 13, No. 4, Aug. 2011, pp. 367-376.

Qualcomm Europe et al., "Automatic Physical Cell Identity Selection in LTE: Requirements and Solutions", Agenda Item: 10.1.1c, Document for: Discussion and Decision, 3GPP TSG-RAN WG3 #60, R3-081090, Kansas City, USA, May 5-May 9, 2008, 4 pp.

* cited by examiner

Figure 4 (≈flowchart #5 in IvD, but only PSS)

METHOD AND ARRANGEMENT FOR PCI ASSIGNMENT

CROSS REFERENCE TO RELATED APPLICATION

This application is a 35 U.S.C. §371 national stage application of PCT International Application No. PCT/SE2013/050086, filed on 1 Feb. 2013, the disclosure and content of which is incorporated by reference herein in its entirety. The above-referenced PCT International Application was published in the English language as International Publication No. WO 2014/120056A1 on 7 Aug. 2014.

TECHNICAL FIELD

The herein suggested technology relates generally to PCIs (Physical Cell Identities) in a wireless communication system, and in particular to the assignment of PCIs to radio base stations, such as eNBs.

BACKGROUND

In order to function in a wireless communication network, a UE (User Equipment) must connect to a cell provided by an RBS (Radio Base Station). In order to access a cell, the UE performs a so-called cell search procedure. By performing a cell search procedure, the UE acquires time and frequency parameters needed in order to correctly demodulate data from an RBS. The parameters acquired during this procedure are in particular e.g.: a symbol start position, a carrier frequency and sampling clock synchronization.

The cell search procedure depends on whether the UE is performing an initial synchronization, i.e. a first detection of a cell and decoding of information needed in order to register to it, or is performing a new cell identification, i.e. the detection of neighboring cells, e.g. as a preparation for handover, when the UE is already connected to a serving cell.

In each cell in an LTE-type system, at least two signals are broadcasted by the eNB serving the cell in order to facilitate the cell search procedure: the so-called Primary Synchronization Signal (PSS) and the so-called Secondary Synchronization Signal (SSS).

Primary Synchronization Signal (PSS)

Figure 1:
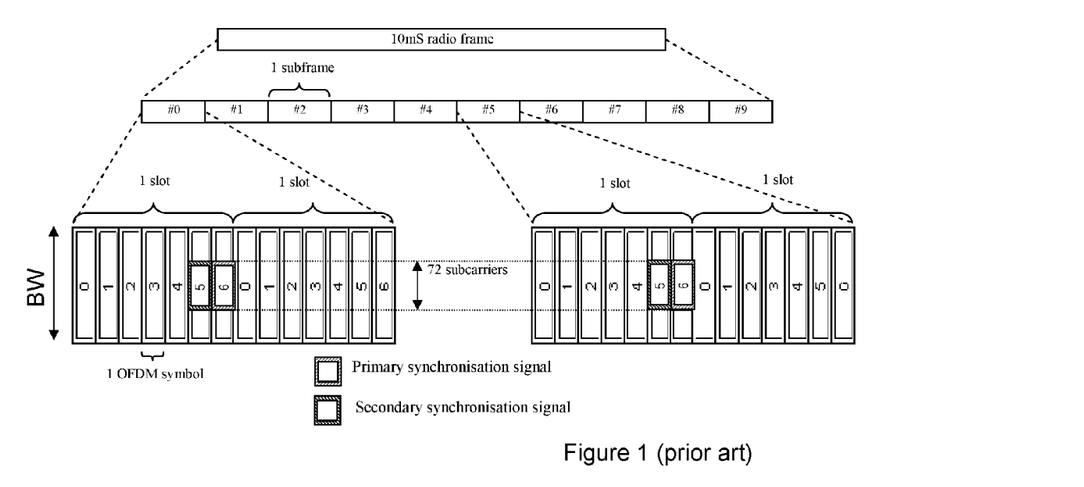
FIG. 1 illustrates the location of SSS and PSS in an LTE frame structure according to the prior art.
Figure 2:
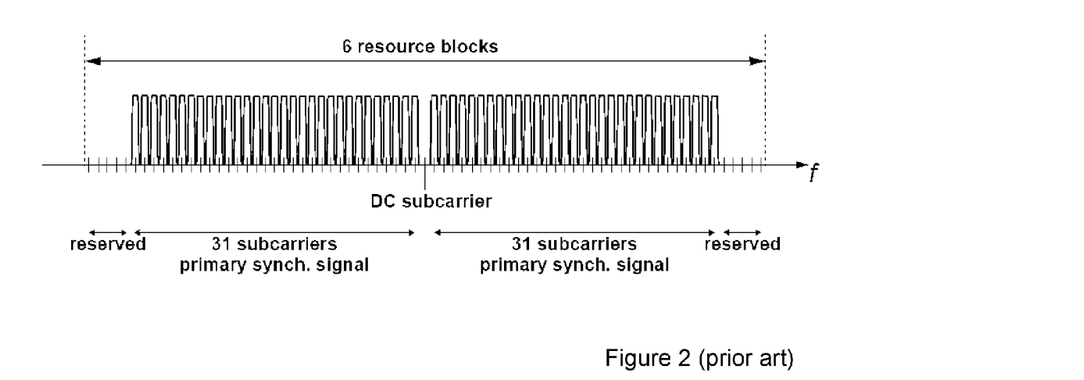
FIG. 2 illustrates the location of an SSS in terms of LTE subcarriers, according to the prior art.

During an initial cell search, a UE first searches for the primary synchronization signal (PSS) which is transmitted in the last OFDM symbol of the first time slot of the first subframe (subframe 0) in a radio frame, cf. FIG. 1. The PSS enables the UE to acquire the slot boundary independently from the chosen cyclic prefix selected for this cell. Based on the downlink frame structure, e.g. Type 1, FDD (Frequency Division Duplexing), the PSS is transmitted twice per radio frame, e.g. first in subframe 0, and is then repeated in subframe 5 (in time slot 11). This enables the UE to get time synchronized on a 5 ms basis. The location of the PSS within the bandwidth is also illustrated in more detail in FIG. 2.

Secondary Synchronization Signal (SSS)

After that a UE has found the 5 ms timing by use of the PSS, it needs to obtain the radio frame timing and the cell's group identity. This information can be derived from the SSS. When regarded in the time domain, the SSS is typically transmitted in the symbol before the PSS, which is also illustrated in FIG. 1. The SSS, like the PSS, also has a 5 ms periodicity. When the SSS is transmitted in the symbol preceding the PSS, this means that the SSS is transmitted in the first and sixth subframes, denoted subframes 0 and 5.

Like the PSS, the SSS is typically transmitted on 62 of the 72 reserved subcarriers around the DC subcarrier.

A PCI to be used in a cell could be derived and assigned to an RBS based on a PSS and an SSS, e.g. according to the formula: PCI=3×SSS+(Spacing×PSS); where "spacing" is a parameter which is selected in order to avoid that adjacent cells get the same frequency shift.

Various strategies may be used to assign or allocate a PCI (Physical Cell Identity) to a cell, e.g. in an LTE network. The choice of the allocation scheme has impact on processing requirements and synchronization performance at the UE. There are a number of PCI planning tools available in the market. However, the performance of these tools is unsatisfactory, and may result in PCI confusion in a system where they are used. The algorithms of these existing PCI planning tools are often based on coverage prediction.

SUMMARY

In order to avoid PCI confusion in a wireless communication network, it would be desired to achieve an improved method and arrangement for assignment of PCIs to RBSs, for use in cells, in a wireless communication network.

It is realized by the inventor that an improved algorithm could be achieved by considering Inter-RBS distance (site density) and number of tiers between RBSs associated with the same PCI, when assigning PCIs. The suggested technology is easy to use and only requires e.g. cell_ids and identifiers of the associated RBSs and RBS locations. The use of the herein described method and network node enables fast and also robust PCI assignment, which is a great advantage.

According to a first aspect, a method is provided for assignment of PCIs. The method is to be performed by a network node in a wireless communication network, where said communication network comprises a plurality of RBSs, of which at least some is to be assigned a PCI. The method comprises determining a most densely located RBS of the plurality of RBSs, based on the distances from each RBS to a certain number of other RBSs of the plurality of RBSs. The method further comprises: for each RBS, i, for which a PCI is to be assigned, assigning an SSS to the RBSi from a set of SSSs, based on a distance from the RBSi to another RBS in the communication network associated with the same SSS, and a number of tiers between the RBSi and, at least, the other RBS. The assigning starts from the most densely located RBS, and is performed in order of increasing distance from the most densely located RBS. The method further comprises assigning a PSS to the RBSi, based on the number of cells associated with the RBSi, and assigning a PCI to the RBSi, based on the SSS and the PSS.

According to a second aspect, a network node is provided for assignment of PCIs in a wireless communication network. The communication network may be assumed to comprise a plurality of RBSs. The network node comprises a determining unit adapted to determine the most densely located RBS out of the plurality of RBSs, based on the distances from each RBS to a certain number of other RBSs of the plurality of RBSs. The network node further comprises an SSS assigning unit, adapted to assign, for each RBS, i, for which a PCI is to be assigned, in order of increasing distance from the most densely located RBS, an SSS to the RBSi, from a set of SSSs, based on a distance from the RBSi to another RBS in the communication network associated with the same SSS. The assigning of an SSS is further based on a number of tiers between the RBSi and, at least, the other RBS. The network node further comprises a PSS assigning unit, adapted to assign a PSS to the RBSi, based on the number of cells associated with the RBSi, and further comprises a PCI assigning unit, adapted to assign a PCI to the RBSi, based on the SSS and the PSS.

According to a third aspect, a computer program is provided, comprising computer readable code means, which when run in a network node causes the network node to perform the method according to the first aspect above.

According to a fourth aspect, a computer program product is provided, comprising a computer program according to the third aspect above.

BRIEF DESCRIPTION OF DRAWINGS

The suggested technology will now be described in more detail by means of exemplifying embodiments and with reference to the accompanying drawings, in which.

DETAILED DESCRIPTION

Herein, a new method for assigning PCIs to RBSs for use in cells in a system will be described. According to the herein suggested technology, the PCIss are assigned to RBSs by use of an algorithm, which may be denoted e.g. Automatic Physical Cell Identity Assignment Algorithm. The algorithm considers spatial, e.g. geographical, distance between cells/RBSs associated with the same PCI and further, which is important, considers the number of tiers between cells/RBSs associated with the same PCI.

Generally, the suggested algorithm can be described as comprising four parts, namely:
Identification of densest area (w.r.t. RBSs/cells)
Assignment of SSS
Assignment of PSS
Assignment of PCI These different parts will be described below with reference to clarifying flow charts. The parts related to assignment of PSS and PCI could alternatively be regarded as one part, since the PCI may be derived according to a formula when the PSS (and the SSS) has been assigned. That is, the PCI may alternatively be considered to be assigned, at least partly, by the assignment of a PSS.

In the description below, "n" will denote the number of SSSs available for assignment (# of SSS).

Identification of Densest Area

The identification of a densest area comprises an identification of the most densely located RBS, or RBS site. Even though it is suggested and assumed herein that the procedure of assigning PCIs starts with identifying the most densely located RBS (densest RBS) amongst a group of RBSs, the method described herein and the expression "a/the most densely located" are also considered to embrace and cover alternative embodiments, such as determining one of the most densely located RBSs (i.e. not necessarily the most densely located, but e.g. the second most densely located), and determining the most densely located RBS amongst the RBSs to which an SSS is to be assigned (in a previously existing system, this is not necessarily the most densely located RBS in the system).

The most densely located RBS is identified as the RBS having the shortest distance, according to some distance measure, to a certain number of other RBSs, e.g. the closest n−1 RBSs. This is perhaps best illustrated by regarding each RBS as being located at the centre of a respective imaginary circle, which just encloses n RBSs. The RBS being located at the centre of the circle having the smallest radius (radius=distance to $n^{th}$ RBS) is identified as the most densely located RBS. That is, the RBS having the shortest spatial, e.g. geographical, distance to n−1 other RBSs is selected to represent the densest area. The reason for "n−1" is that since the number of available SSSs is n, the SSSs will need to be reused, at least, beyond this imaginary circle. This will be further explained below. The algorithm is flexible to consider any no of RBS (by changing value of variable) in the imaginary circle, but the best results could be found when applying a radius for the "n−1" RBS, i.e. with a total of n RBSs in the imaginary circle.

Assignment of SSS

When the most densely located RBS, or the "densest RBS", has been identified, SSSs should be assigned to RBSs which do not have a valid SSS, e.g. which have not previously been assigned an SSS (all RBSs in case of Green Field Plan), and/or, which are to be assigned a new, updated SSS (e.g. in case of reassignment of SSSs in an existing system). The SSSs are preferably assigned to RBSs in the order of increasing distance to the densest RBS. In an LTE-type system, there are, at present, a maximum number of 168 different SSSs. The assignment of an SSS to an RBS, i, (RBSi) may comprise evaluation of a candidate SSS by determining of a spatial, e.g. geographical, distance between the RBSi to a closest other RBS which is associated with the candidate SSS, and comparing such distances for a number of candidate SSSs, e.g. for all SSSs available for assignment. The SSS for which the spatial distance to a closest other RBS, associated with the same SSS, is the longest, may then be assigned to the RBSi if there is a required number of tiers (other RBSs) between the two RBSs. In case there are too few tiers in between, RBSs closer to the RBSi are evaluated in a similar way. In case of a so called "Green Field Plan", there are no SSSs associated with any of the RBSs to begin with. Therefore, for assignment of SSSs in conjunction with a Green Field Plan, there will be no other RBS associated with the candidate SSS during the assignment of SSS to the first n RBSs.

Figure 3:
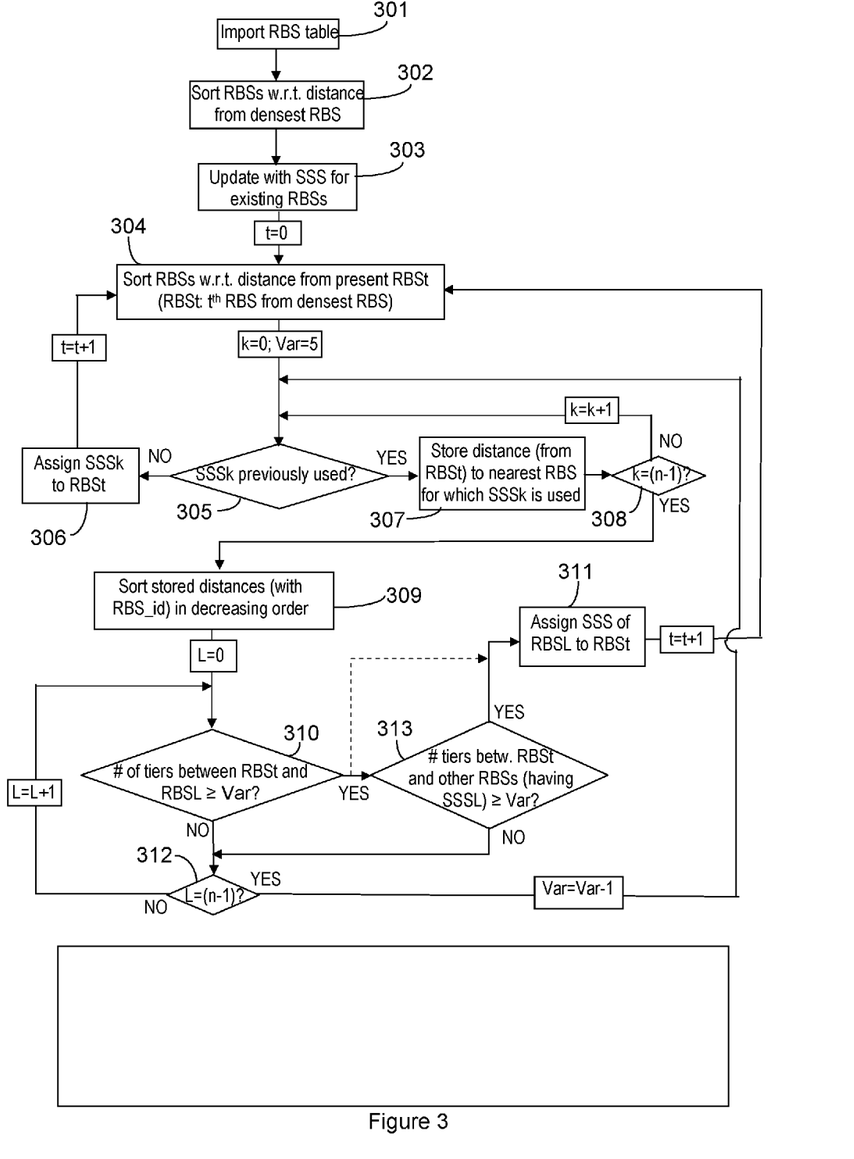
FIG. 3 is a flow chart illustrating a procedure for assignment of SSSs, according to an exemplifying embodiment.

An exemplifying embodiment of a procedure for assigning SSS will be described below with reference to the flow chart in FIG. 3. When the procedure begins, it is assumed that a "densest RBS" or "most densely located RBS" has been determined. The input data to the procedure illustrated in FIG. 3 is assumed to be a set, e.g. in form of a record, list or table (the term "table" will be used herein) comprising information on a number of RBSs, such as RBS_id, a density measure or at least an indication of the densest RBS, and location information, e.g. coordinates. In FIG. 3, the input of data is illustrated as the import of an RBS table in an action 301, the table being provided e.g. by a preceding step identifying a densest RBS. The RBSs comprised in the table could be e.g. all RBSs in a system, existing and planned, or a selected subset thereof.

The table is sorted in an action 302 with respect to geographical distance to the densest RBS. That is, the densest RBS is the first entry after sorting, the RBS located closest to the densest RBS is the second entry, the RBS located second closest to the densest RBS is the third entry, etc., until the last entry, which is the RBS located furthest away from the densest RBS. This sorted table will henceforth be denoted "TBD". Even though the term "sorting" is used here, the different entries do not necessarily need to be arranged in a special order, but the table could e.g. be parsed, and the order found based on a distance measure in relation to the densest RBS.

If the procedure is run for an existing system, i.e. which comprises RBSs already being associated with an SSS, such previously assigned SSSs could be inserted in the sorted table in association with the RBSs in question, in an action 303. The RBSs not yet being associated with an SSS could be indicated, e.g. by use of some indicator which could not be mistaken for a valid SSS, such as e.g. "−1". In case the procedure is run for a Green Field Plan, no RBSs will be associated with an SSS at this stage.

The rest of the procedure illustrated in FIG. 3 aims at assigning SSSs to RBSs (planned or existing) which do not, for any reason, have a valid SSS. Below, the assignment of SSSs for RBSs in a Green Field Plan will be described, since this is perhaps the context which is easiest to comprehend. In case the procedure is run for a mix of "old and new" RBSs, (i.e. already existing and "to be launched" RBSs/cells) where some are associated with an SSS and some are not, the ones which are already associated with a (valid) SSS are present in the sorted table, but are not evaluated for assignment of SSS in the following procedure (i.e. these RBSs will not be an "RBSt", as described herein).

The RBSs in the sorted table "TBD" (created in action 302) are now resorted (e.g. in another table, "TBt"), with respect to geographical distance to the first RBS in the table TBD, which is to be assigned an SSS. In case of Green Field Plan, which is to be described here, the first RBS in TBD, for which an SSS is to be assigned, is the densest RBS (first entry in TBD), and thus the first TBt(t=0) will be identical to TBD.

Further, a set of SSSs is assumed to be available for assignment and use in the communication system. As previously described, there may be a certain number of SSSs defined, e.g. in a standard, for a type of system. For example, there are 168 SSSs defined for LTE systems as per 3GPP. Such defined SSSs are thus the SSSs allowed for use in the system. The set of SSSs available for assignment in a procedure as the one illustrated in FIG. 3 in a particular communication system may be a selection of, i.e., a subset of the number of SSSs defined for the system. For example, some of the defined SSSs could be reserved for future use or for another system. Alternatively, the set could comprise all SSSs defined for the system in question. Herein, the set is described as comprising a number "n" of SSSs.

In action 305, it is determined whether a first candidate SSS (e.g. first entry in a record comprising set of SSSs: SSS(k) or SSSk, where k=0) has been previously used in the system for any of the other RBSs in TBt. For a Green Field Plan, this will not be the case, and therefore, the first candidate SSS (SSS(k=0)) is assigned to the current RBSt, in action 306. In the flow chart in FIG. 3, the variable t is then set to t+1, which indicates that the next RBS in TBD, to which an SSS is to be assigned, will now be the new RBSt. At least for Green Field Plan, RBSt will now be the second entry in TBD.

The RBSs are sorted in action 304 with respect to their geographical distance to the new RBSt, e.g. in a new table TBt. Then, it is determined in action 305 whether a first candidate SSSk(k=0) is previously used in the system. Since the first candidate SSSk was assigned to the preceding RBS, it will be determined in action 305 that it was used before. Thus, the distance between RBSt and the (closest) RBS associated with the first candidate SSSk(k=0) is determined and maintained, e.g. stored in a table "TBK", for possible later use. The distance is stored in association with the RBS_ids of the RBSs in question and with the current SSSk.

It is determined in action 308 whether the current value of the variable "k" equals n−1. Assuming that n=140 in this example, i.e. the number of SSSs available for use is 140. Thus, the variable "k" may take on 140 different values, e.g. 0-139 (which will be used in this example, and thus "n−1" in action 308). When evaluating the first candidate SSSk, the value of k is 0 (k=0). Thus, k≠(n−1) is determined in action 308, after which the value of k is increased, i.e. k=k+1. Thus, the next candidate SSSk(k=1) in the set is evaluated in action 305. Since only one SSS from the set has been assigned so far, and we discuss RBSs in a Green Field Plan, this candidate SSSk(k=1) has not been previously used, and may thus be assigned to the present RBSt in action 306. By this, the current table TBK may be discarded.

In this way, one by one of the RBSs in TBD will be assigned an SSS from the set of candidate SSSs. Below, it will be described what happens when the $140^{th}$ RBSt in TBD has been assigned the $140^{th}$, i.e. the last unused candidate SSS, and the $141^{st}$ RBSt should be assigned an SSS.

For the $141^{st}$ RBSt, all the candidate SSSs (i.e. SSSk for all values 0-139 of k) will have been used before. Thus, after evaluation of all 140 SSS candidates in action 305, the current table TBK will comprise one distance value for each of the 140 candidate SSSs, and k will be determined to be equal to n−1 in action 308.

The distance values in TBK are sorted in decreasing order in action 309. That is, the first entry in the sorted table, here denoted TBKsort, comprises the largest distance from RBSt to the closest RBS associated with one of the candidate SSSs in the set. As previously described, TBK, and thus TBKsort, also comprises, at least a reference to, the identity of the RBSs and the SSSs associated with the different distance values. The first entry of TBKsort would thus, in this example, comprise the distance from the $141^{st}$ RBSt to the one of the first 140 RBSs in TBD, which is located furthest away from the $141^{st}$ RBSt. The first entry of TBKsort would also comprise at least an indication of the identity or name of the RBS in question (RBS_id), and the SSS associated with this RBS. The second entry in TBKsort will comprise the second largest distance from RBSt to the closest RBS associated with one of the candidate SSSs in the set. The second entry of TBKsort would thus, in this example, comprise the distance from the $141^{st}$ RBSt to the RBS located second furthers away of the first 140 RBSs in TBD, etc.

However, as realized by the inventor, it is not certain that the SSS associated with the RBS located furthest away (of the RBSs in TBK/TBKsort) is the most suitable for RBSt. Therefore, the number of tiers between RBSt and the RBS associated with the largest distance in TBK/TBKsort is determined in an action 310. By "number of tiers" is here meant number of RBSs located between RBSt and the RBS associated with the largest distance (RBSL(L=0); where distance "DL" (L=0) is the largest distance in TBK, and thus the first entry in TBKsort. The desired minimum number of tiers has in this example been initially set to 5, and is illustrated by the variable "Var" (Var=5).

If the number of tiers between RBSt and RBSL(L=0) is larger than or equal to Var, i.e. 5 in this example, the SSS associated with RBSL may be assigned to RBSt in action 311. However, if not, i.e. when #tiers<5, it is determined in action 312 whether all RBSs in TBKsort has been evaluated, i.e. whether L=(n−1) ("n−1" since L herein may take on values 0-139). Assuming that the first four entries in TBKsort (L=0, 1, 2, 3) are associated with a number of tiers which is lower than Var, but the fifth entry (L=4) is associated with 6 tiers, which exceeds Var; then the SSS associated with RBSL(L=4) may be assigned to RBSt in action 311 (dashed arrow from 310 to 311). If none of the entries in TBKsort is associated with a number of tiers which fulfills the requirement of Var, the variable Var is decreased by 1, i.e. Var=(Var−1), and the procedure will be performed again with the new value of Var. The entries in TBKsort will be evaluated again w.r.t. number of tiers between RBSt and RBSL starting from farthest RBS until assignment can be done. Finally, when one of the entries in TBKsort fulfills the requirement of Var, the SSS associated with this entry is assigned to RBSt, and t is set to t+1, and the procedure is repeated for the next RBS in TBD, for which an SSS is to be assigned.

In an even more robust version of the procedure, not only the number of tiers between RBSt and RBSL is evaluated, but the number of tiers between RBSt and a plurality of RBSs, e.g. all RBSs in table TBD or TBt within a certain distance from RBSt, which are associated with the same SSS as RBSL, i.e. SSSL. In FIG. 3, this evaluation is illustrated as an action 313, performed when the number of tiers between RBSt and RBSL is found to be equal to or to exceed Var. Alternatively, this evaluation could be performed in action 310. In this case, an SSS is assigned to RBSt in action 311 when an SSSL is found, for which the number of tiers between RBSt and the plurality of RBSs, e.g. all RBSs in TBt except RBSt (including RBSL), is equal to or exceeds Var. This procedure, when comprising evaluation of number of tiers between the RBSt and a plurality of other RBSs being associated with one and the same SSS, has the advantage of detecting remote RBSs with a low number of tiers to the RBSt, which may otherwise be overlooked.

Assignment of PSS

After the assignment or allocation of an SSS to an RBS, a PSS should be allocated to the RBS for each respective cell associated with the RBS. In an LTE-type system, the PSS may take on three different values: 0, 1 or 2. Thus, three distinct PSS/SSS combinations could be derived based on one SSS. An RBS having more than three cell sectors, i.e. cells, should therefore be allocated an extra SSS per additional three cells in order to enable generation of at least as many different PSS/SSS combinations as cells of the RBS.

The assignment of multiple SSSs to an RBS_A, having more than three cells, may be solved e.g. by creating one or more "dummy RBSs" with the same location as RBS_A, and inserting said dummy RBSs in the RBS table used as input to the SSS assignment procedure described above. An example of such creation of a dummy RBS will be described further below.

Figure 4:
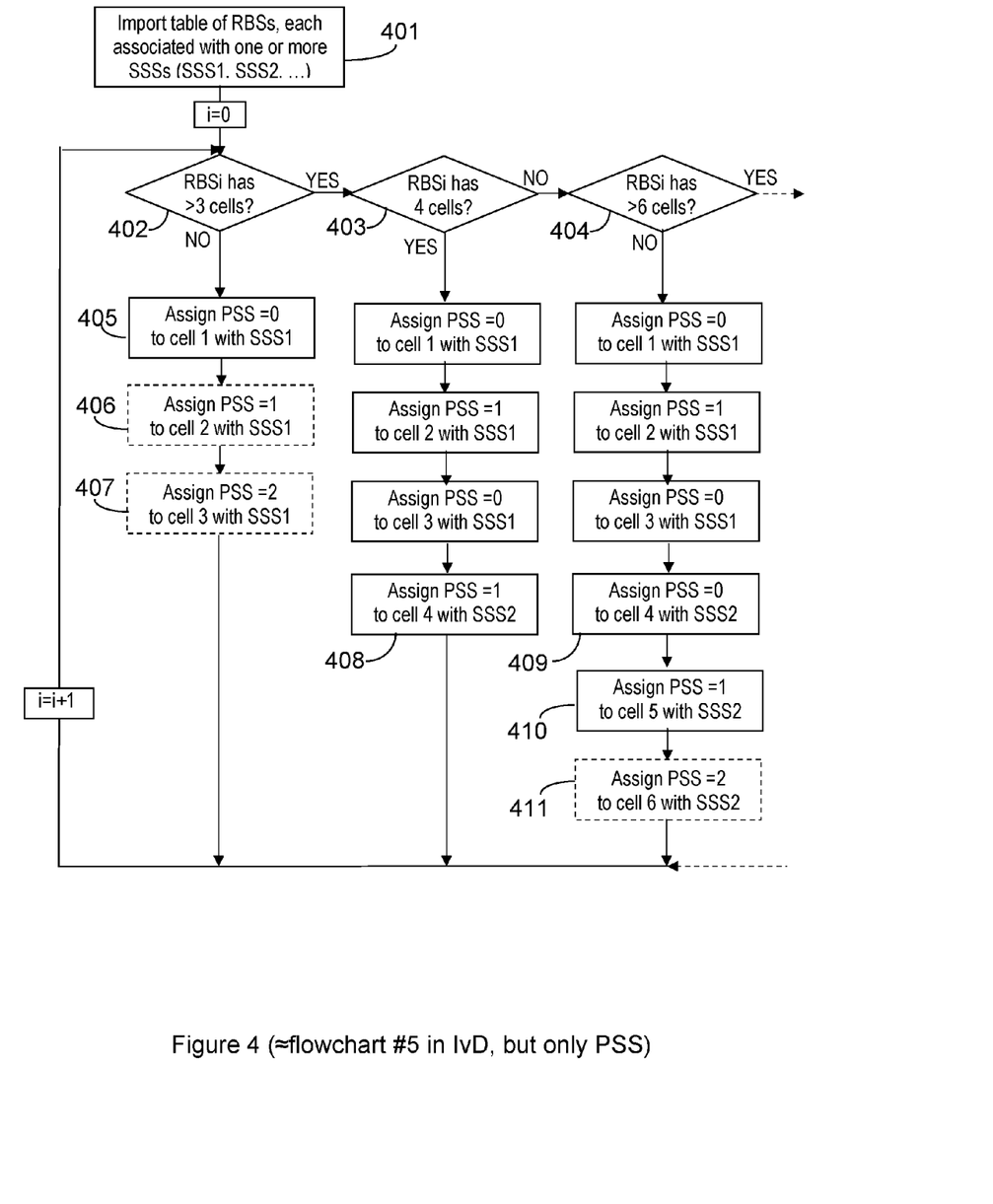
FIG. 4 is a flow chart illustrating a procedure for PSS assignment, according to an exemplifying embodiment

A method for assigning PSSs is illustrated in FIG. 4. The input to the method is information on a set of RBSs, each associated with one or more cells and one or more SSSs. The information may be input to the method e.g. in form of a table in an action 401. Either the table only comprises RBSs, of which at least one cell does not have a valid PCI, or the method may comprise actions for determining which values that are already assigned and/or which values that need to be assigned. No such actions are illustrated in FIG. 4. If assuming, again, that the procedure is run in association with, or for, a Green Field Plan, then all cells will require assignment of a PSS.

For each RBSi in the table, it should be determined how many cells it has. In the embodiment illustrated in FIG. 4, this is done in steps, starting with an action 402, where it is determined whether RBSi has more than 3 cells. If not, PSSs are assigned to RBSi for the cell or cells associated therewith in actions 405-407. Actions 406 and 407 have a broken outline in FIG. 4, to indicate that these assignments depend on whether there actually are a second and third cell or not.

When an RBSi has more than 3 cells, it is determined in an action 403, whether the number of cells is 4. The reason for this special treatment of 4 cells or (m×3)+1) cells or mod 3(#cells)=1 is that a frequency shift FS should not take on the same value in two adjacent cells.

Figure 6A:
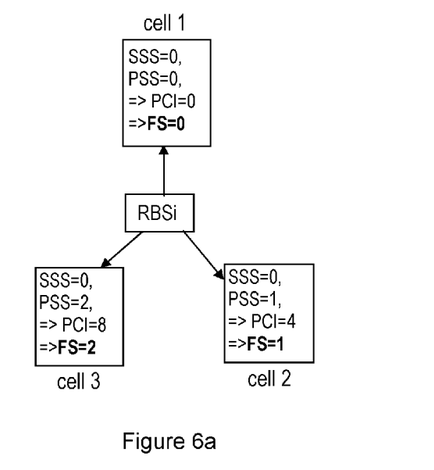
FIG. 6a-d illustrates different constellations of cells and their assigned SSS and PSS and a resulting frequency shift, FS, per cell.
Figure 6B:
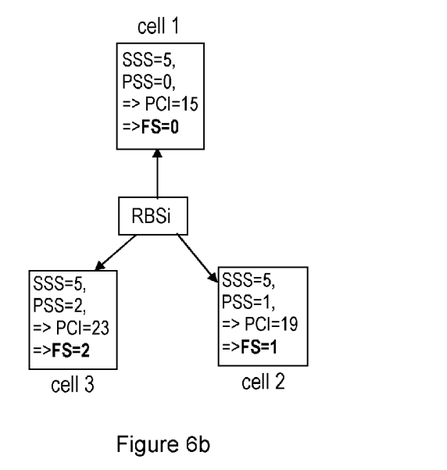
Figure 6C:
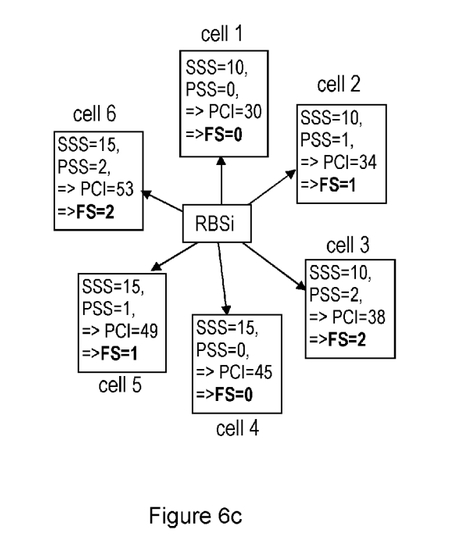
Figure 6D:
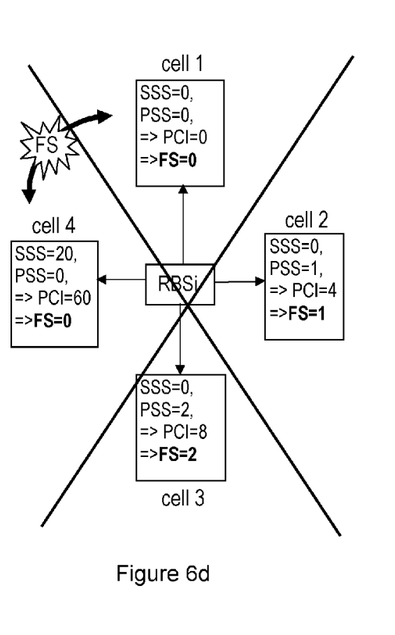

The Frequency shift is given by mod 3(PCI) in MIMO and mod 6(PCI) in SIMO. The situation when mod 3(#cells)=1 is illustrated in FIG. 6d. FIGS. 6a and 6b illustrates, schematically, RBSs having 3 cells; FIG. 6c illustrates an RBS having 6 cells, and FIG. 6d an RBS having 4 cells. The PCI of each cell is assumed to be derived by PCI=3×SSS+ (spacing×PSS). Assuming MIMO, the FS is given by: FS=mod 3 (3×SSS+(spacing×PSS)). The parameter "spacing" is known in the art, and may be selected to be e.g. 1, 4, or 8 to avoid having the same FS in adjacent cells, which works fine e.g. for 1-3, 5, 6, 8 or 9 cells, but not for 4 or 7, etc. When applying the same strategy for assigning PSS to 4 or 7 cell RBSs, the situation illustrated in FIG. 6d may occur, i.e. two adjacent cells has the same FS.

Figure 7:
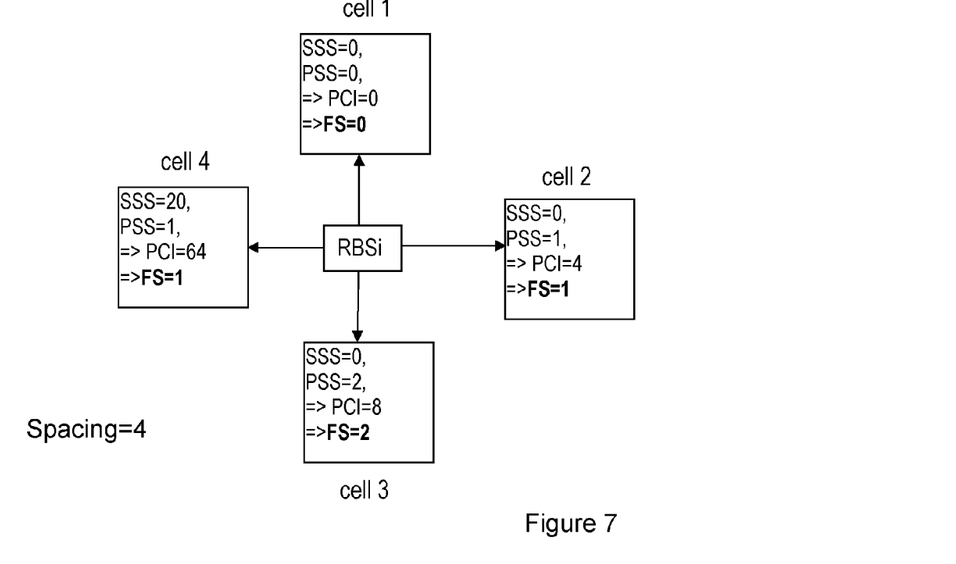
FIG. 7 illustrates a correct assignment of PSS, achieved by use of the suggested technology, as opposed to the situation illustrated in FIG. 6d.

Even though the $1^{st}$ and the $4^{th}$ cell in FIG. 6d have different SSSs, the FS still becomes the same. This is avoided by not assigning the same PSS value to the $4^{th}$ or $7^{th}$ cell, etc., as to the $1^{st}$ cell. Assigning the same PSS to the $4^{th}$ or $7^{th}$ cell, as to the $3^{rd}$ or $6^{th}$ cell would also result in adjacent cells having the same FS. Therefore, the $4^{th}$ or $7^{th}$ cell, etc., is assigned the same PSS as the $2^{nd}$ or $5^{th}$ cell, i.e. the same PSS as a non-adjacent cell. This is illustrated in FIG. 7. In FIGS. 6a-d and 7, the spacing is 4. Here, it is assumed that the cells, or cell sectors, are numbered in a consecutive order as they appear e.g. from 0-365 degrees around the RBS.

Assignment of PCI

When an SSS and a PSS have been assigned to an RBS, a PCI could be derived for the combination of SSS and PSS, and thus be assigned to the RBS for use in a cell associated with the RBS. The PCI could, as previously described, be derived, e.g. according to the formula:

$$PCI=3\times SSS+(\text{Spacing}\times PSS)$$

Figure 5:
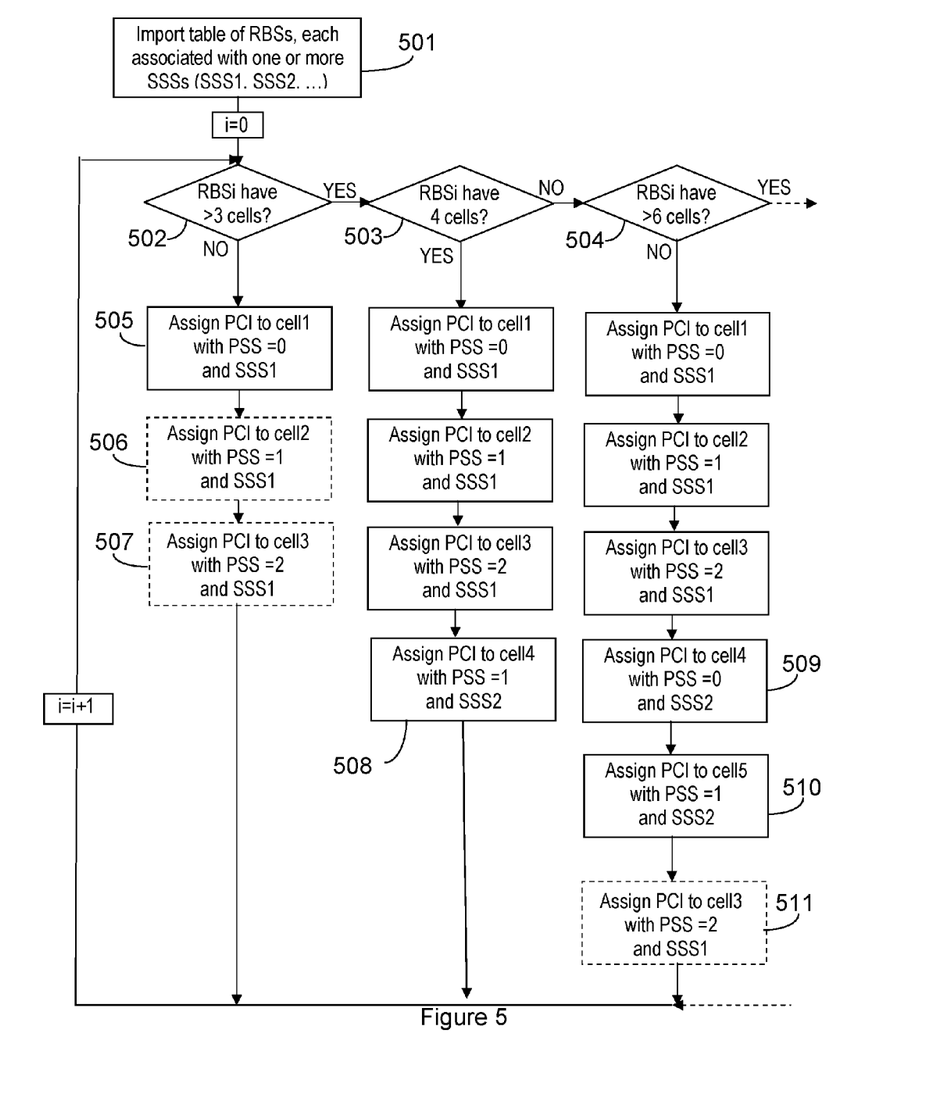
FIG. 5 is a flow chart illustrating a procedure for PCI assignment, according to an exemplifying embodiment. The procedure is similar to the one illustrated in FIG. 4, only that a PCI assigned in association with the assigning of a PSS is illustrated.

The PCI could be assigned in association with the assigning of a PSS, as previously described and illustrated in FIG. 5.

Assignment of Multiple SSSs to One RBS

The number of cells associated with each RBS could be determined e.g. based on a cell table, or similar, in which e.g.

all cells in a system are listed in association with an RBS, which is to serve the cell, and the geographical position of said RBS. By counting the number of occurrences of an RBS name or RBS ID in the cell table, an RBS table may be generated comprising all unique RBSs (RBS_ids) and the number of cells associated with each RBS. If RBS_A occurs four times in the cell table, the RBS table will for example comprise an entry identifying RBS_A, the number of cells associated with RBS_A, i.e. four in this example, and the geographical position of RBS_A.

As previously mentioned, an RBS having more than three cells will require more than one SSS in order to derive distinct PCIs for all cells. The procedure for assigning SSSs illustrated in FIG. 3 provides assignment of one SSS to each RBS in the RBS table (or corresponding) obtained in action 301, which does not yet have a valid SSS. One way of achieving assignment of more than one SSS to an RBS is to create more than one representation of the RBS in the table.

This may be achieved e.g. by adding a "dummy RBS" associated with an RBS having more than three cells. The dummy RBS is set to have the same location as the original RBSs with which it is associated. Accordingly, two dummy RBSs could be added for an RBS having more than six cells, etc. In this way, each added dummy will be assigned an SSS, which then may be associated with the original RBS. The dummy RBSs could then be removed before assigning of PSS, and the SSSs associated with the dummy RBSs could be assigned to the original RBS.

That is, an "original RBS", i.e. an existing RBS, having 6 cells is divided into two RBSs having 3 cells each. An original RBS having 5 cells is divided into two RBSs, one having 3 cells and one having 2 cells. An original RBS having 4 cells is divided into two RBSs, one having 3 cells and one having 1 cell. The resulting table of RBSs will comprise original RBSs and dummy RBSs, which all have 3 or less cells. This table may then be input to the procedure illustrated in FIG. 3.

Figure 8:
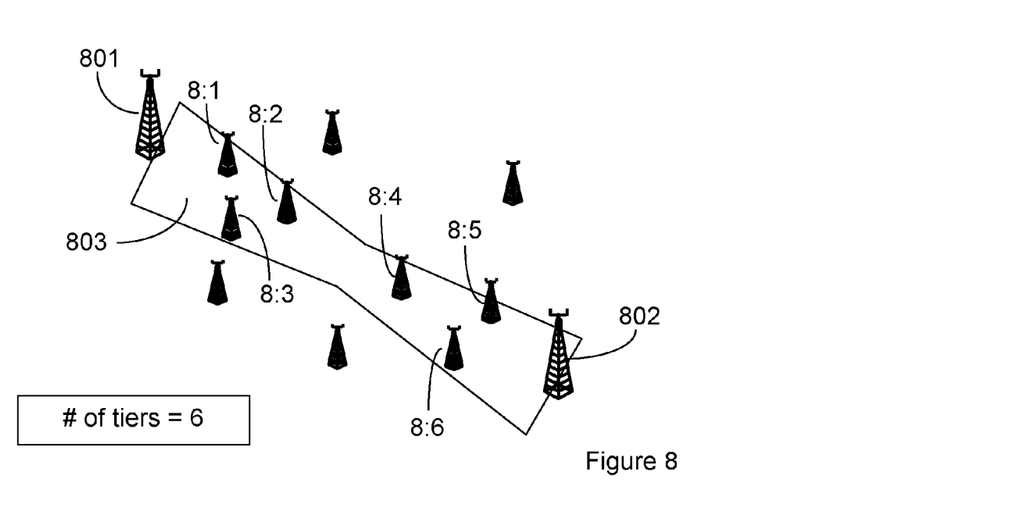
FIG. 8 illustrates the principle for determining a number of tiers between two RBSs, 801 and 802.

Determining of Number of Tiers, FIG. 8

The number of tiers between two RBSs is to be determined as part of the procedure for assigning a PCI, see e.g. actions 310 and 313 in FIG. 3. One way of determining the number of tiers between two RBSs, e.g. RBSt and RBSL is to determine, i.e. count, the number of RBSs located within an area defined between RBSt and RBSL. The area may have the shape e.g. of a rectangle or a concave polygon, such as an "hourglass-shape".

FIG. 8 illustrates two RBSs, 801 and 802, between which the number of tiers is to be determined. In this example, the area 803, in which intermediate RBSs are considered to contribute to the number of tiers, is defined as a concave polygon in the shape of an hourglass of certain dimensions. The dimensions, e.g. the relation between length and width, of the area 803 may be predefined, or depend e.g. on the distance between the RBSs 801 and 802. In this example, the number of RBSs located within the area 803 (except for RBS 801 and 802, if defined to be located within 803) constitutes the number of tires between 801 and 802. In FIG. 8, there are six RBSs (except for 801 and 802) located within the area 803, namely 8:1-8:6. Thus, the number of tiers between RBS 801 and RBS 802 is six.

Figure 9A:
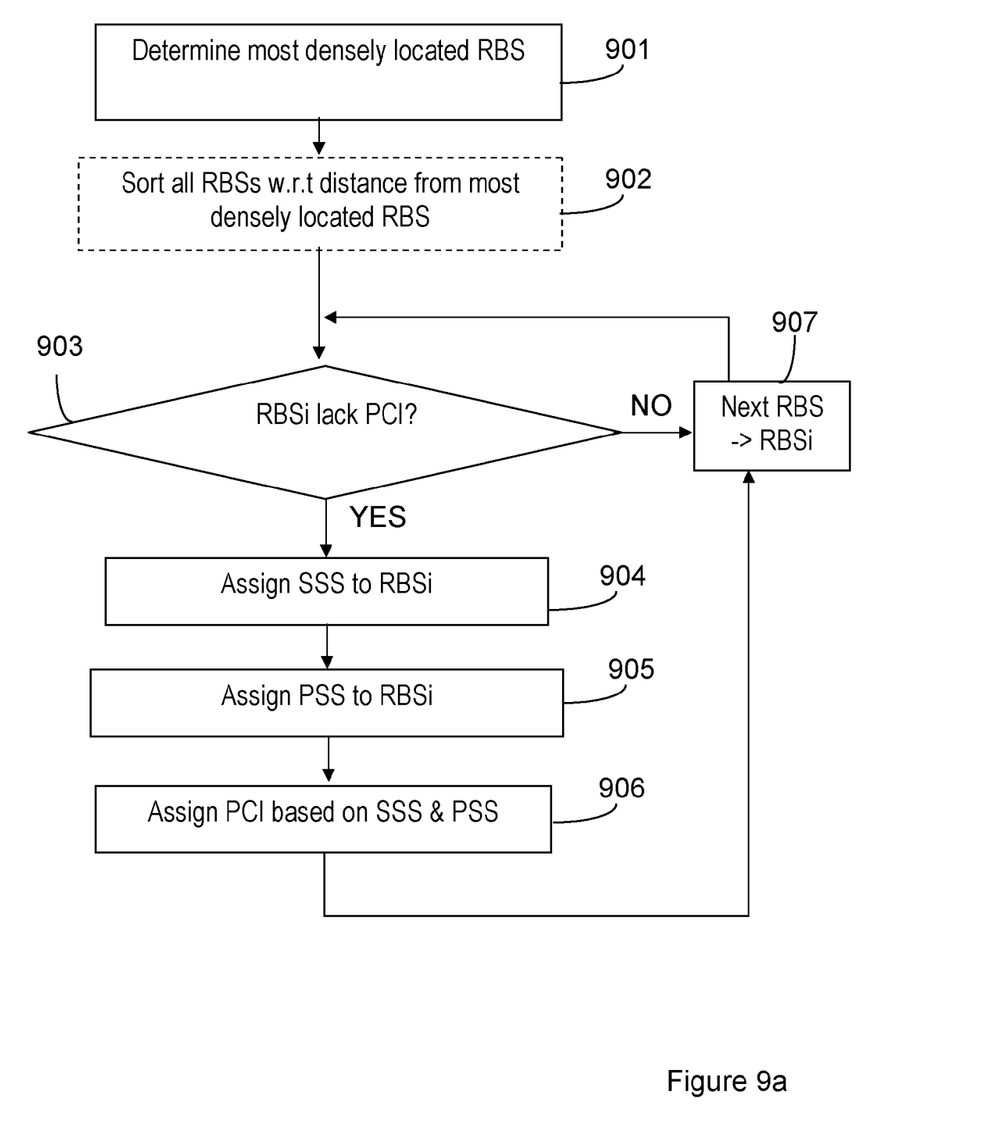
FIGS. 9a and 9b are flow charts illustrating procedures for assignment of PCIs, according to exemplifying embodiments.
Figure 9B:
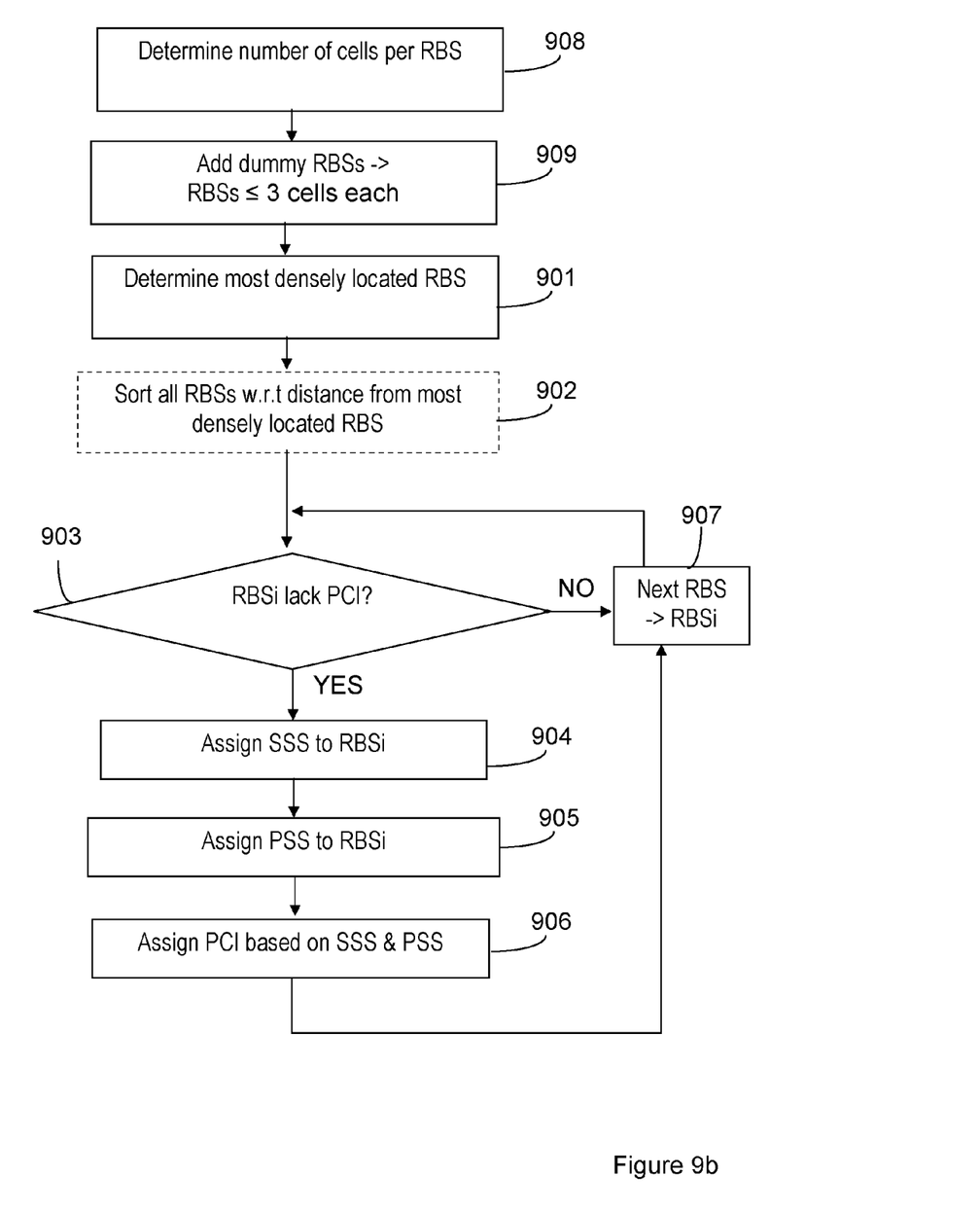

Exemplifying Procedure, FIG. 9a-b

Below, an exemplifying procedure for assigning PCIs will be described in a more general manner with reference to FIG. 9a. The procedure, or method, is assumed to be performed by a network node operable in a wireless communication network, where the communication network comprises a plurality of RBSs, of which one or more lack at least one PCI, i.e. do not have a valid PCI for at least one cell.

The most densely located RBS of the plurality of RBSs in the communication network is determined in an action 901. The most densely RBS is determined based on the distances from each RBS to a certain number of other RBSs of the plurality of RBSs. The certain number of other RBSs may e.g. be the number of candidate SSSs−1, as previously described, even though other numbers are possible. Further, the method is robust enough to handle cases where the most densely located RBS is represented by any one of the most densely located RBSs. Then, starting from the most densely located RBS, for each RBS, i, for which a PCI is to be assigned, in order of increasing distance from the most densely located RBS, an SSS, a PSS and a PCI is assigned, in actions 904-906.

The ordering according to increasing distance to the most densely located RBS is here illustrated as an optional sorting action 902, with a broken outline. The fact that assignment is only made to RBSs which should be assigned a PCI is illustrated as the determining action 903. For example, RBSs which should be assigned a PCI could have been associated with a dummy PCI value outside a range of possible PCI values, which dummy PCI value could serve as an indicator of that a valid PCI value should be assigned.

An SSS from a set of SSSs is assigned to the RBSi in an action 904, based on a criterion related to distance from the RBSi to another RBS in the communication network, associated with the same SSS, and a number of tiers between the RBSi and the other RBS. A PSS is assigned to the RBSi in an action 905, based on the number of cells associated with the RBSi. A PCI is assigned to the RBSi in an action 906, based on the SSS, the PSS and a predefined spacing factor. One or more SSSs, PSSs and PCIs may be assigned to an RBS based on how many cells the RBS is to have (serve), as previously described. When one or more PCIs have been assigned to RBSi, the procedure continues to the next RBS which is to be assigned a PCI, which is illustrated as that the next RBS is set to RBSi in action 907. The procedure may continue until no RBS remains which is to be assigned a PCI.

In FIG. 9b, some additional actions are illustrated, which have the purpose of handling RBSs which are associated with more than three cells. The number of cells associated with an RBS is determined in an action 908. The input to action 908 is here assumed to be a record, e.g. a table comprising a plurality of cells, e.g. all cells in the system, or at least all cells in the part of the system which is considered for the assignment of PCIs. The cells in the table are assumed to be indicated in association with an RBS and a location of the RBS. Thus, by counting the number of cells associated with one and the same RBS, the number of cells per RBS may be determined.

RBSs which are associated with more than three cells should be assigned more than one SSS, etc., as previously described. Therefore, in order only to handle RBSs having three cells or less, dummy RBSs are added to the number of RBSs in an action 909. The dummy RBSs are indicated to have the same location as an original RBS and are made holders of cells exceeding three for the original RBSs. A table comprising original and dummy RBSs may then be input to action 901, each RBS being associated with three cells or less. Actions 901-907 may be considered to have the same functions as described in association with FIG. 9a.

Figure 10:
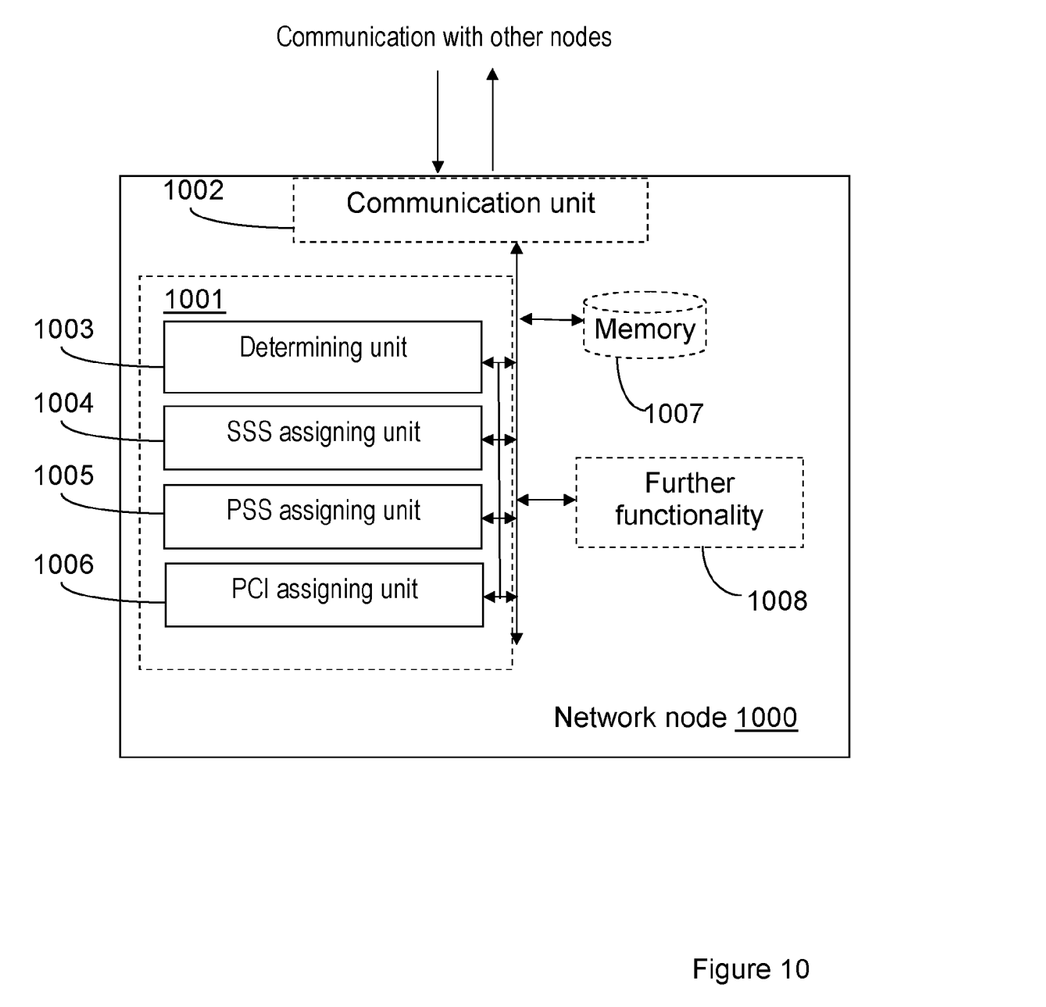
FIGS. 10 and 11 are block charts illustrating arrangements according to exemplifying embodiments.

Exemplifying Arrangement, FIG. 10

Below, an example arrangement 1001 in a network node 1000, adapted to enable the performance of the above described procedures, will be described with reference to FIG. 10. The network node is operable in a wireless communication network, where the communication network comprises a plurality of RBSs, of which one or more lack at least one PCI, i.e. do not have a valid PCI for at least one cell. The wireless communication network is primarily thought to be a so-called "4G" network, such as an LTE-type network or system, but could alternatively be of another type. The network node could be a base station, such as an eNB in an LTE-type network, or an OSS (Operations Support System) node in an LTE-type network. By OSS node is referred to e.g. any node, e.g. in a core network, having OSS functionality. The network node 1000 is illustrated as to communicate with other entities via a communication unit 1002, comprising means for wireless and/or wired communication. The network node may comprise functional units 1008, such as e.g. functional units for managing and/or monitoring system resources.

The arrangement 1001 or network node 1000, or parts thereof, could be implemented e.g. by one or more of: a processor or a micro processor and adequate software and memory for storing thereof, a Programmable Logic Device (PLD) or other electronic component(s) or processing circuitry configured to perform the actions described above.

The network node comprises a determining unit, 1003, adapted to determine the most densely located RBS out of the plurality of RBSs, based on the distances from each RBS to a certain number of other RBSs of the plurality of RBSs. The network node further comprises an SSS assigning unit, 1004, adapted to assign, for each RBS, i, for which a PCI is to be assigned, in order of increasing distance from the most densely located RBS, an SSS to the RBSi from a set of SSSs, based on a distance from the RBSi to another RBS in the communication network associated with the same SSS, and a number of tiers between the RBSi and, at least, the other RBS.

The network node further comprises a PSS assigning unit 1005, adapted to assign a PSS to the RBSi based on the number of cells associated with the RBSi. The network node further comprises a PCI assigning unit 1006, adapted to assign a PCI to the RBSi, based on the SSS and the PSS. The arrangement 1001 and/or the network node 1000 may be further adapted to enable the performance of any of the above described procedures and alternative implementations. Such adaptations are, however, not described here, in order to avoid unnecessary repetition.

Figure 11:
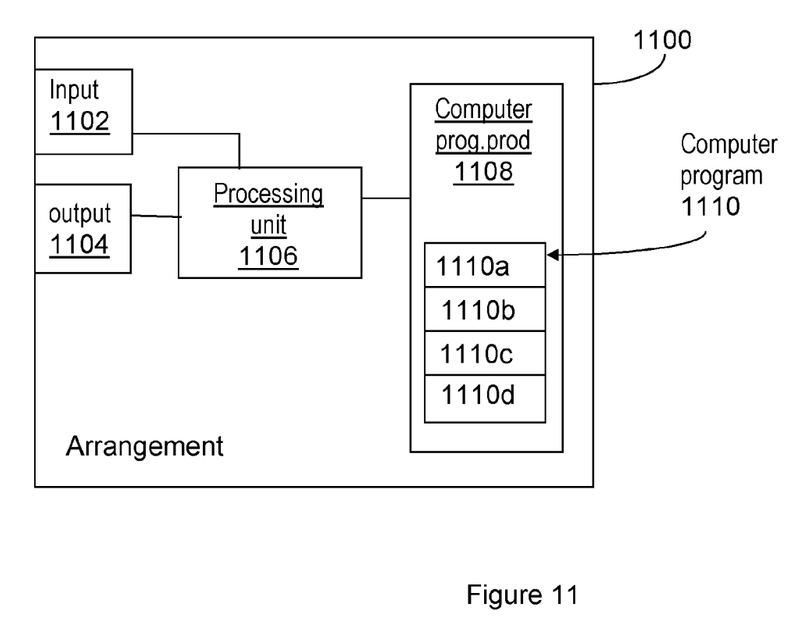

Exemplifying Arrangement, FIG. 11

FIG. 11 schematically shows a possible embodiment of an arrangement 1100, which also can be an alternative way of disclosing an embodiment of the arrangement 1001 in the network node 1000 illustrated in FIG. 10. Comprised in the arrangement 1100 are here a processing unit 1106, e.g. with a DSP (Digital Signal Processor). The processing unit 1106 may be a single unit or a plurality of units to perform different actions of procedures described herein. The arrangement 1100 may also comprise an input unit 1102 for receiving signals from other entities or nodes, and an output unit 1104 for providing signals to other entities or nodes. The input unit 1102 and the output unit 1104 may be arranged as an integrated entity.

Furthermore, the arrangement 1100 comprises at least one computer program product 1108 in the form of a non-volatile memory, e.g. an EEPROM (Electrically Erasable Programmable Read-Only Memory), a flash memory and/or a hard drive. The computer program product 1108 comprises a computer program 1110, which comprises code means, which when executed in the processing unit 1106 in the arrangement 1100 causes the arrangement and/or a node in which the arrangement is comprised to perform the actions e.g. of the procedure described earlier in conjunction with FIG. 9a or 9b.

The computer program 1110 may be configured as a computer program code structured in computer program modules. Hence, in an exemplifying embodiment, the code means in the computer program 1110 of the arrangement 1100 may comprise a determining module 1110a for determining a most densely located RBS out of a plurality of RBSs. The arrangement 1100 may further comprise an SSS assigning module 1110b for assigning an SSS, to an RBS, from a set of SSSs, based on a distance from the RBS to another RBS in the communication network associated with the same SSS, and further based on a number of tiers between the RBS and, at least, the other RBS.

The computer program may further comprise a PSS assigning module 1110c for assigning a PSS to the RBS, based on the number of cells associated with the RBS. The computer program 1110 may further comprise a PCI assigning module 1110d for assigning a PCI to the RBS, based on the SSS and the PSS.

The modules 1110a-d could essentially perform the actions of the flows illustrated in FIG. 9a and/or 9b, e.g. to emulate the arrangement 1000 in the network node illustrated in FIG. 10.

Although the code means in the embodiment disclosed above in conjunction with FIG. 11 are implemented as computer program modules which when executed in the processing unit causes the decoder to perform the actions described above in the conjunction with figures mentioned above, at least one of the code means may in alternative embodiments be implemented at least partly as hardware circuits.

A previously mentioned, the processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the method and network node or arrangement for PCI assignment as suggested above has been described with reference to specific embodiments provided as examples, the description is generally only intended to illustrate the suggested technology and should not be taken as limiting the scope of the suggested methods and arrangements, which are defined by the appended claims. While described in general terms, the method and arrangement may be applicable e.g. for different types of communication systems which apply synchronization signals and in which PCIs, or corresponding, are to be assigned.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. It should also be noted that the units or modules described in this disclosure are to be regarded as logical entities and not with necessity as separate physical entities.

ABBREVIATIONS eNB evolved Node B (radio base station)
LTE Long Term Evolution
PCI Physical Cell Identity
PSS Primary Synchronization Signal
RBS Radio Base Station
SSS Secondary Synchronization signal

The invention claimed is:

1. A method for assignment of Physical Cell Identities, PCIs, performed by a network node in a wireless communication network, said communication network comprising a plurality of Radio Base Stations (RBSs), the method comprising:
   determining a most densely located RBS of the plurality of RBSs, based on distances from each RBS to a certain number of other RBSs of the plurality of RBSs;
   starting from the most densely located RBS:
   for each RBS, i, for which a PCI is to be assigned, in order of increasing distance from the most densely located RBS:
   assigning a Secondary Synchronization Signal, SSS, to the RBSi from a set of SSSs, based on a distance from the RBSi to another RBS in the communication network associated with the same SSS, and a number of tiers between the RBSi and, at least, the other RBS;
   assigning a Primary Synchronization Signal, PSS, to the RBSi, based on the number of cells associated with the RBSi;
   assigning a PCI to the RBSi, based on the SSS and the PSS;
   based on the assignment of the PCI to the RBSi, communicating the PCI to the RBSi to control radio frequency signaling transmitted from the RBSi to user equipments within a cell serviced by the RBSi.

2. The method according to claim 1, wherein the determining of the most densely located RBS comprises determining a distance from each RBS, m, to the one of the certain number of other RBSs that is located furthest away from said RBS, m, and comparing the determined distances with each other.

3. The method according to claim 1, wherein the assigning of an SSS comprises:
   determining whether another RBS in the communication network is associated with a candidate SSS from the set of SSSs.

4. The method according to claim 1, wherein the allocating of an SSS comprises determining a number of tiers between the RBSi and another RBS associated with a candidate SSS, and comparing the determined number of tiers to a reference number of tiers.

5. The method according to claim 1, wherein the number of tiers between the RBSi and another RBS is defined as the number of RBSs located within an area between the RBSi and the other RBS.

6. The method according to claim 5, wherein the area has the shape of a concave polygon or a rectangle.

7. The method according to claim 1, wherein the allocating of a PSS comprises:
   determining the number of cells associated with RBSi.

8. The method according to claim 1, wherein the assigning of a PCI comprises deriving a PCI using a predefined formula taking the assigned SSS and PSS as input.

9. A network node for assignment of Physical Cell Identities, PCIs, in a wireless communication network, said communication network comprising a plurality of Radio Base Stations (RBSs), said network node configured to:
   determine a most densely located RBS out of the plurality of RBSs, based on distances from each RBS to a certain number of other RBSs of the plurality of RBSs;
   assign, for each RBS, i, for which a PCI is to be assigned, in order of increasing distance from the most densely located RBS, a Secondary Synchronization Signal, SSS, to the RBSi from a set of SSSs, based on a distance from the RBSi to another RBS in the communication network associated with the same SSS, and a number of tiers between the RBSi and, at least, the other RBS;
   assign a Primary Synchronization Signal, PSS, to the RBSi, based on the number of cells associated with the RBSi,
   assign a PCI to the RBSi, based on the SSS and the PSS;
   based on the assignment of the PCI to the RBSi, communicate the PCI to the RBSi to control radio frequency signaling transmitted from the RBSi to user equipments within a cell serviced by the RBSi.

10. The network node according to claim 9, wherein the determining of the most densely located RBS comprises determining a distance from each RBS, m, to the one of the certain number of other RBSs that is located furthest away from said RBS, m, and comparing the determined distances with each other.

11. The network node according to claim 9, wherein the assigning of an SSS comprises: determining whether another RBS in the communication network is associated with a candidate SSS from the set of SSSs.

12. The network node according to claim 9, wherein the allocating of an SSS comprises determining a number of tiers between the RBSi and another RBS associated with a candidate SSS, and comparing the determined number of tiers to a reference number of tiers.

13. The network node according to claim 9, wherein the number of tiers between the RBSi and another RBS is defined as the number of RBSs located within an area between the RBSi and the other RBS.

14. The network node according to claim 13, wherein the area has the shape of a concave polygon or a rectangle.

15. The network node according to claim 9, wherein the assigning of a PCI comprises deriving a PCI using a predefined formula taking the assigned SSS and PSS as input.

16. The network node according to claim 9, wherein the assigning of a PCI comprises deriving a PCI using a predefined formula taking the assigned SSS and PSS as input.

17. A computer program product, comprising a non-transitory computer readable storage medium storing program code, which when run in a network node causes the network node to perform the method according to claim 1.

* * * * *